May 12, 1925.  1,537,812
T. ERICKSON
ROLLER BEARING SLEEVE PULLER
Filed April 28, 1924  2 Sheets-Sheet 1
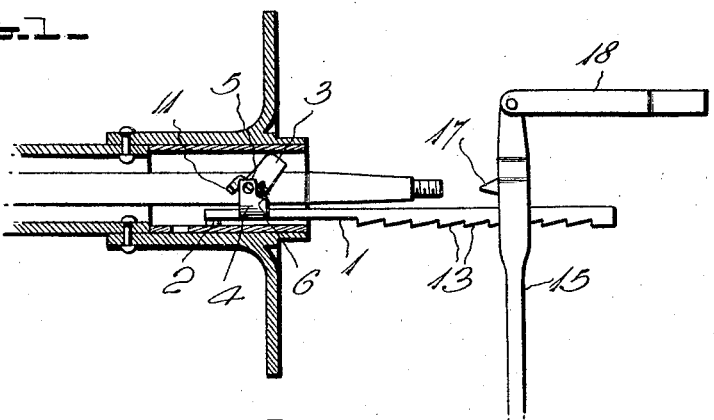
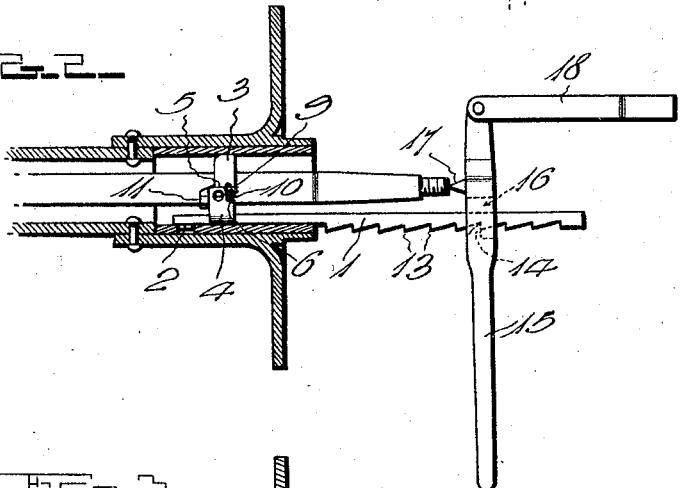
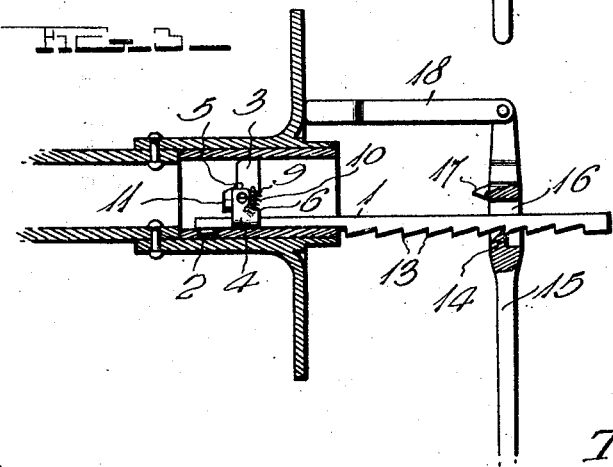
Witness
H. Woodard
Inventor
T. Erickson
By H. B. Willson & Co.
Attorneys May 12, 1925. 1,537,812
T. ERICKSON
ROLLER BEARING SLEEVE PULLER
Filed April 28, 1924  2 Sheets-Sheet 2
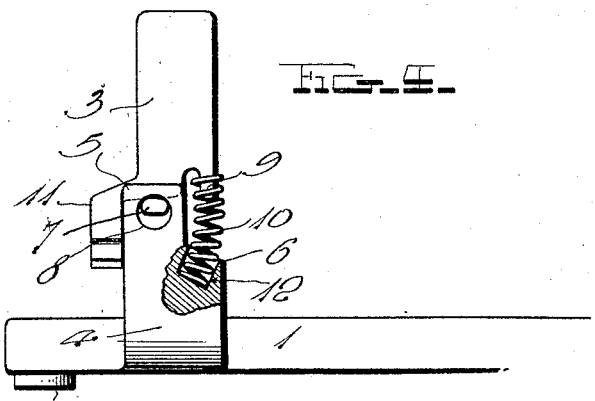
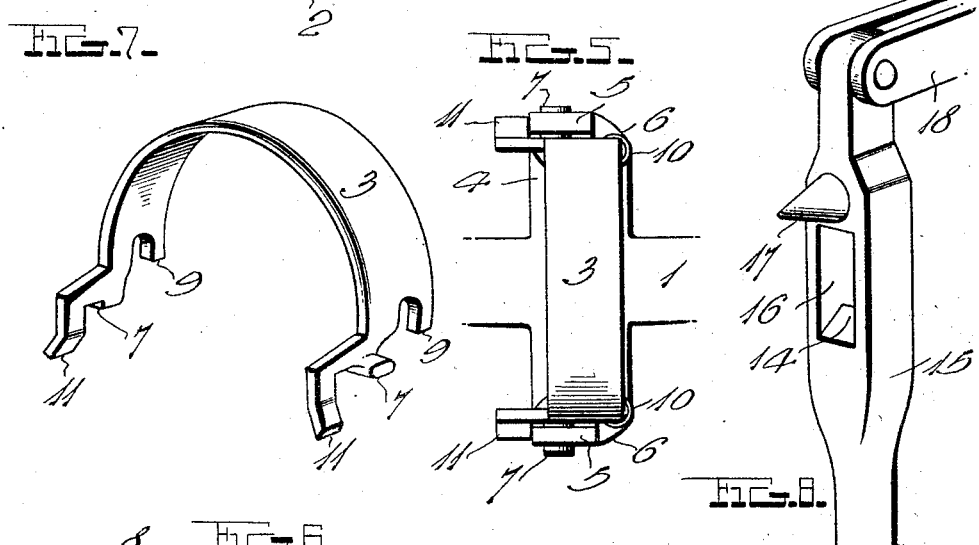
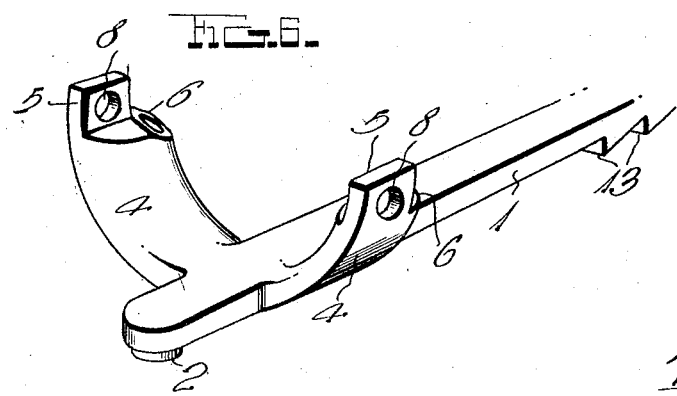
Witness
H. Woodard
Inventor
T. Erickson
By H. B. Wilson Yeo
Attorneys Patented May 12, 1925.

1,537,812

UNITED STATES PATENT OFFICE.

THEODORE ERICKSON, OF HOLLAND, MICHIGAN, ASSIGNOR TO HOLLAND MFG. CO., OF HOLLAND, MICHIGAN.

ROLLER-BEARING-SLEEVE PULLER.

Application filed April 23, 1924. Serial No. 709,613.

*To all whom it may concern:*

Be it known that I, THEODORE ERICKSON, a citizen of the United States, residing at Holland, in the county of Ottawa and State of Michigan, have invented certain new and useful Improvements in Roller-Bearing-Sleeve Pullers; and I do declare the following to be a full, clear, and exact description of the invention, such as will enable others skilled in the art to which it appertains to make and use the same.

In removing roller bearing sleeves from the ends of automobile axle housings and the like, a great deal of difficulty is often experienced, and it is the object of my invention to provide an improved type of puller for sleeves of this character, by whose use, such sleeves may be quickly and easily removed, the construction being preferably such that the sleeve may be withdrawn, either with the axle extending through said sleeve or with such axle removed.

With the foregoing in view, the invention resides in the novel subject matter hereinafter described and claimed, the description being supplemented by the accompanying drawings.

Figure 1 is a side elevation showing the manner of inserting the device in the roller bearing sleeve of a rear automobile axle, with the driven axle extending through said sleeve.

Figure 2 is a view similar to Fig. 1, but illustrating the device in position for withdrawing the sleeve.

Figure 3 is a view similar to Fig. 2, but showing the manner in which the device is employed to remove a sleeve after the adjacent axle section has been withdrawn.

Figure 4 is an enlarged side elevation partly in section, showing the portion of the device which is insertible into the sleeve to be removed.

Figure 5 is a plan view of the parts shown in Fig. 4.

Figure 6 is a perspective view of the sleeve pulling bar and the lateral arms with which it is provided.

Figure 7 is a perspective view of the sleeve-engaging member which is pivoted to the arms of the pulling bar.

Figure 8 is a perspective view of the actuating lever for the pulling bar.

In the drawings above briefly described, the numeral 1 designates an elongated bar whose front end is adapted to be inserted into a bearing sleeve to be removed, said bar being provided with means, such as the lug 2, to engage the sleeve, at one side of the latter, said lug being adapted primarily for reception in the usual opening in the side of the sleeve as shown in Figs. 1, 2 and 3. A sleeve-engaging member 3 extends laterally from the bar 1 and is pivoted to the latter on an axis extending transversely thereof, said member 3 being adapted to swing toward the bar as shown in Fig. 1, so that it may be readily inserted into the sleeve with said bar. Then, when the lug 2 has been engaged with the sleeve opening, or any other sleeve-engaging means with which said bar may be provided, is properly engaged with the sleeve, the member 3 is adapted to swing outwardly away from the bar, to the position disclosed in Figs. 2 and 3. In this position, it abuts the sleeve and prevents lateral movement of the bar 1, in a direction which would permit said bar to disengage the sleeve. Thus, an outward pull on the bar, with sufficient force, will withdraw the sleeves from its holding position. Preferably, spring means is associated with the bar 1 and the member 3, to outwardly swing the latter when the device is in proper position within the sleeve.

In constructing and mounting the member 3, I prefer to employ the details disclosed. A pair of oppositely extending curved arms 4 have been shown projecting from the front portion of the bar 1 and disposed in a common transverse plane, the upper ends of said arms terminating in ears 5 whose rear edges are preferably spaced inwardly from the rear edges of said arms, leaving shoulders 6 at the upper rear corners of said arms. The member 3 is shown of arched form and it may well be formed of a single piece of metal, the ends of said member being provided with outwardly extending trunnions 7 which are received in openings 8 formed in the ears 5. Behind these trunnions, the ends of the member 3 are provided with downwardly extending studs 9 for reception in the upper ends of coiled compression springs 10, and in front of the trunnions 7, the ends of the member 3 are provided with lateral stops 11 to abut the front edges of the arms 4, so as to limit the outward swinging of said member away from the bar 1. In the construction shown, the springs 10 have their lower ends received in sockets 12, formed in the arms 4 and opening through the shoulders 6.

To insert the device, whether the axle remains within the bearing sleeve or has been previously removed therefrom, the member 3 is swung rearwardly against the action of the springs 10, permitting the front end of the device to readily enter the sleeve, as shown in Fig. 1. As soon as the bar 1 is properly engaged with the sleeve, which in the present disclosure, necessitates reception of the lug 2 in the sleeve opening, the springs 10 right the member 3 and it thus abuts the sleeve, so that the bar cannot move inwardly and disengage from said sleeve. Then, an outward pull upon the bar will withdraw the sleeve very easily.

Any desired means may be employed for outwardly pulling upon the bar 1. I prefer however to provide the outer portion of this bar with a plurality of teeth 13 to engage a tooth 14 on a hand lever 15, said lever having an opening 16 through which the bar 1 passes slidably. A fulcrum spur 17 has been shown on the lever 15 to engage the outer end of a driven axle as shown in Fig. 2 so that rocking of the lever about said fulcrum spur will pull outwardly on the bar 1 and extract the bearing sleeve. This spur can only be used when the axle section remains in place. Hence, in order that the lever 15 may be used also when said axle section has been removed, a pivoted leg 18 is preferably provided on one end of the lever, which leg may be swung inwardly as shown in Fig. 3 and engaged with the end of the axle housing or other desired part, so that it may act as a fulcrum for the lever.

Excellent results are obtainable from the simple and inexpensive construction which has been shown and described, and such construction is therefore preferably followed, but within the scope of the invention as claimed, numerous modifications may be made.

I claim:

1. A roller bearing sleeve pulling device comprising a bar for insertion into a bearing sleeve, said bar having means to engage the sleeve at one side of the latter, and a sleeve-engaging member insertible into the sleeve with and pivoted to said bar on an axis transverse to the latter, said member extending laterally from said bar and being adapted to swing toward the same for insertion into said sleeve, said member being then adapted to swing outwardly from said bar and abut the sleeve to hold said bar in engagement therewith.

2. A structure as specified in claim 1; together with spring means acting on said pivoted member and reacting on said bar for outwardly swinging the former when the device is in position in the bearing sleeve.

3. A roller bearing sleeve pulling device comprising a bar insertible into a bearing sleeve and provided with means to engage the sleeve at one side of the latter, said bar having a pair of lateral arms disposed in a common transverse plane and insertible into the bearing sleeve, and a curved sleeve-engaging member pivoted to said arms on an axis transverse to the bar, said member being adapted to swing toward said bar when the device is being inserted into the sleeve and being then adapted to swing away from said bar and abut the sleeve to hold the device engaged therewith.

4. A structure as specified in claim 3; together with spring means acting on said pivoted member and re-acting upon said bar to swing the former outwardly away from said bar.

5. A roller bearing sleeve pulling device comprising a bar insertible into a bearing sleeve and provided with means to engage the sleeve at one side of the latter, said bar having a pair of lateral arms disposed in a common transverse plane and insertible into the bearing sleeve, a curved sleeve-engaging member pivoted to said arms on an axis transverse to the bar, said member having spring-engaging studs at one side of its pivotal axis and stops at the other side of such axis, the latter being adapted to abut said arms and limit the outward swinging of said member away from the bar, and coiled compression springs thrusting at one end against portions of said arms and at their other ends receiving said pin-engaging studs, whereby to swing said member outwardly to the limit allowed by said stops.

In testimony whereof I have hereunto affixed my signature.

THEODORE ERICKSON.